(12) United States Patent
Abdul-Rasool et al.

(10) Patent No.: US 9,199,646 B2
(45) Date of Patent: Dec. 1, 2015

(54) METHOD AND SYSTEM FOR A VEHICLE

(75) Inventors: Mustafa Abdul-Rasool, Järfälla (SE);
Oskar Johansson, Stockholm (SE);
Mikael Ögren, Norsborg (SE)

(73) Assignee: SCANIA CV AB (SE)

( * ) Notice: Subject to any disclaimer, the term of this patent is extended or adjusted under 35 U.S.C. 154(b) by 0 days.

(21) Appl. No.: 14/118,924

(22) PCT Filed: Jun. 7, 2012

(86) PCT No.: PCT/SE2012/050608
§ 371 (c)(1),
(2), (4) Date: Nov. 20, 2013

(87) PCT Pub. No.: WO2012/169962
PCT Pub. Date: Dec. 13, 2012

(65) Prior Publication Data
US 2014/0088847 A1 Mar. 27, 2014

(30) Foreign Application Priority Data

Jun. 10, 2011 (SE) ....................................... 1150529

(51) Int. Cl.
*G06F 7/00* (2006.01)
*B60W 30/18* (2012.01)
(Continued)

(52) U.S. Cl.
CPC ......... *B60W 30/18072* (2013.01); *B60W 10/02* (2013.01); *B60W 10/06* (2013.01); *B60W 10/11* (2013.01); *B60W 30/143* (2013.01); *B60W 50/0097* (2013.01); *B60W 2030/1809* (2013.01); *B60W 2550/142* (2013.01);
(Continued)

(58) Field of Classification Search
CPC .................. B60W 30/18072; B60W 30/143;
B60W 10/02; B60W 10/06; B60W 2600/00
USPC .............................. 701/54, 55, 57, 67, 70, 58
See application file for complete search history.

(56) References Cited

U.S. PATENT DOCUMENTS 5,754,968 A * 5/1998 Hedstrom ....................... 701/66
2006/0046896 A1 * 3/2006 Nakajima et al. ............. 477/107

(Continued)

FOREIGN PATENT DOCUMENTS

| DE | 10 2008 023 135 A1 | 11/2009 |
| DE | 10 2009 057 393 A1 | 6/2011 |
| WO | WO 2005/084995 A1 | 9/2005 |
| WO | WO 2010/128898 A1 | 11/2010 |

OTHER PUBLICATIONS

International Search Report mailed Oct. 17, 2012 in corresponding PCT International Application No. PCT/SE2012/050608.

*Primary Examiner* — Helal A Algahaim
*Assistant Examiner* — Shardul Patel
(74) *Attorney, Agent, or Firm* — Ostrolenk Faber LLP

(57) ABSTRACT

A method for running a vehicle (100) that includes a combustion engine (101) which can selectively be connected to a driveshaft (104, 105) to deliver driving force to the driveshaft (104, 105) for propulsion of the vehicle (100). When the vehicle (100) is in motion, determining whether the vehicle (100) is approaching a downgrade and, when it is approaching the downgrade, disconnecting the engine (101) from the driveshaft (104, 105) before the vehicle (100) reaches the downgrade. Also a system and a vehicle are disclosed.

17 Claims, 5 Drawing Sheets

(51) Int. Cl.
*B60W 10/02* (2006.01)
*B60W 10/06* (2006.01)
*B60W 10/11* (2012.01)
*B60W 30/14* (2006.01)
*B60W 50/00* (2006.01)

(52) U.S. Cl.
CPC ... *B60W 2550/143* (2013.01); *B60W 2550/402* (2013.01); *B60W 2600/00* (2013.01); *B60W 2720/10* (2013.01); *B60W 2720/103* (2013.01); *Y02T 10/84* (2013.01)

(56) References Cited

U.S. PATENT DOCUMENTS

| | | | |
|---|---|---|---|
| 2006/0293824 A1* | 12/2006 | Steen et al. | 701/70 |
| 2008/0015760 A1* | 1/2008 | Yamauchi | 701/67 |
| 2010/0286884 A1* | 11/2010 | Bunn | 701/70 |
| 2012/0065852 A1* | 3/2012 | Eriksson et al. | 701/54 |
| 2012/0253617 A1* | 10/2012 | Halleberg et al. | 701/54 |
| 2012/0253619 A1* | 10/2012 | Jensen | 701/58 |

* cited by examiner

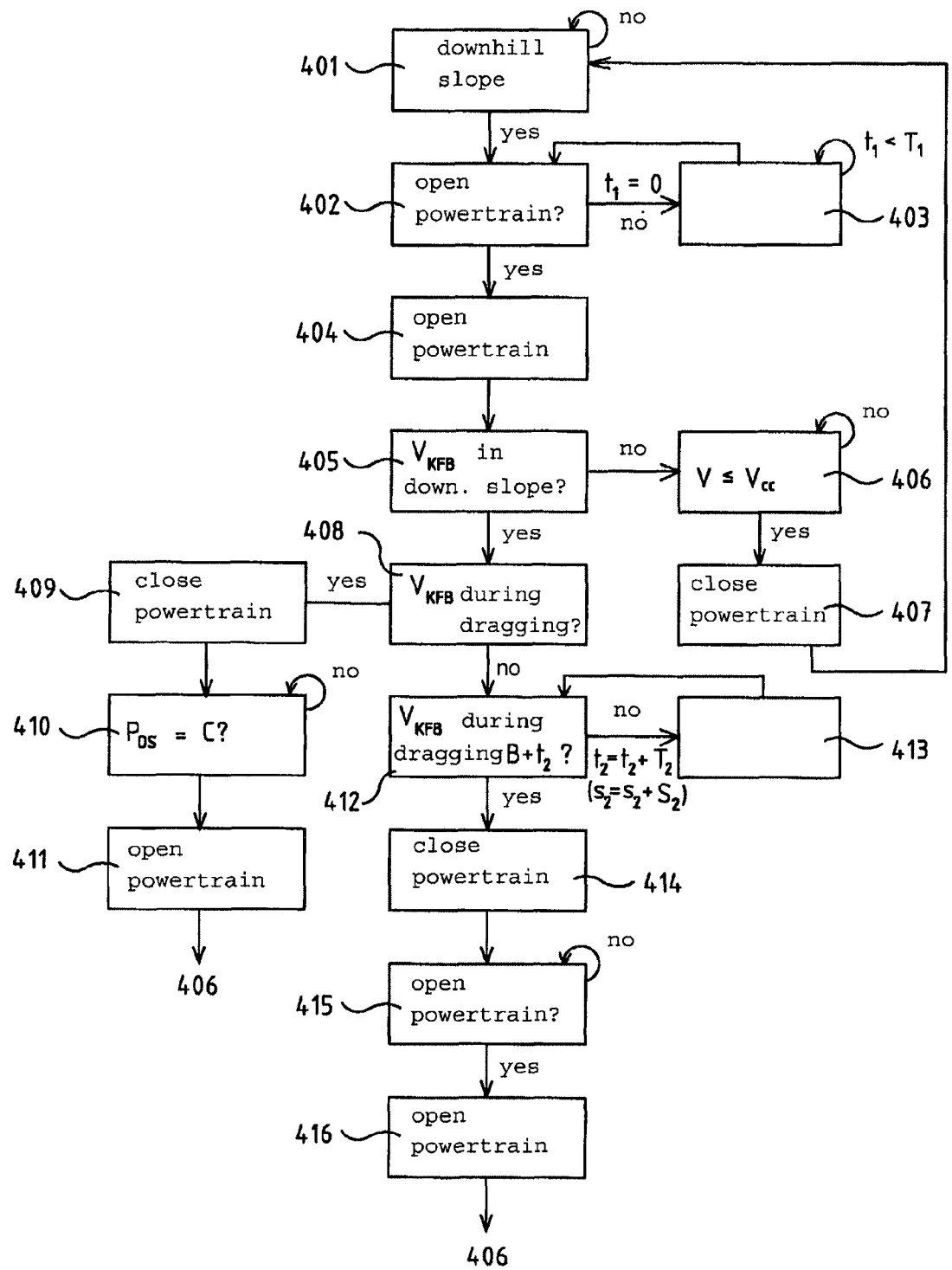

METHOD AND SYSTEM FOR A VEHICLE

CROSS-REFERENCE TO RELATED APPLICATIONS

The present application is a 35 U.S.C. §§371 national phase conversion of PCT/SE2012/050608, filed Jun. 7, 2012, which claims priority of Swedish Application No. 1150529-4, filed Jun. 10, 2011, the contents of which are incorporated by reference herein. The PCT International Application was published in the English language.

FIELD OF THE INVENTION

The present invention relates to a method and a system for running a vehicle. In particular, the invention relates to a method and a system for running a vehicle in situations where a reduced power requirement for propulsion of said vehicle prevails. The present invention relates also to a vehicle and to a computer program and a computer program product which implement the method according to the invention.

BACKGROUND TO THE INVENTION

Cruise controls are now usual in motor vehicles, e.g. cars, trucks and buses. A purpose of a cruise control is to achieve a uniform predetermined vehicle speed, and the cruise control may be of traditional type aiming at constant vehicle speed. This may be achieved by adapting the engine torque to avoid retardation, e.g. by increasing the engine torque uphill. A general purpose for cruise control is to achieve convenient running of the vehicle and also greater comfort for its driver.

A driver of a vehicle with cruise control function usually sets a speed $v_{cc}$ as the speed which he/she wishes the vehicle to maintain until the cruise control function is for any reason deactivated. The cruise control then determines a reference speed $v_{ref}$ which it demands from the portion of the vehicle's control system which controls the vehicle's engine, e.g. an engine control unit.

If the cruise control function is of traditional type as above, $v_{ref}$ will be equal to the set speed $v_{cc}$, in which case the vehicle will continually endeavour to maintain the speed $v_{cc}$ set by the driver. A cruise control function of this kind thus causes the vehicle to try to maintain the speed set irrespective of whether it is travelling uphill, downhill or on a horizontal running surface. This means that the vehicle may be accelerated over the crest of a hill, only to be immediately braked on a subsequent downgrade to avoid exceeding the set speed. This method is thus an uneconomic way of running the vehicle, particularly in the case of heavy vehicles.

It is generally the case that apart from the vehicle's procurement cost the main items of expenditure for its routine operation comprise driver pay, repair and maintenance costs and fuel to power the vehicle, and the fuel cost may very greatly affect profitability for an owner of the vehicle, e.g. a haulage company or the like.

For this reason there are cruise control functions which endeavour to modify the running of the vehicle on the basis of knowledge of the road ahead, so that its fuel consumption can be kept as low as possible. This may for example be achieved by means of cruise control functions whereby the reference speed $v_{ref}$ can be allowed to deviate from the speed $v_{cc}$ chosen by the driver, on the basis of knowledge of the vehicle's itinerary, in order thereby to run the vehicle in a more fuel-economising way.

An example of such a cruise control is one which uses a so-called "look-ahead" function. A look-ahead cruise control (LACC) is a cruise control which uses knowledge of road sections ahead, i.e. knowledge of the nature of the road ahead of the vehicle, to determine the reference speed signal $v_{ref}$ and thus also to modify the vehicle's speed according to variations of the road along which the vehicle travels. Heavy vehicles often have automatically operated gearboxes whereby gear changes are controlled by means of a suitable on-board control system, e.g. a gearbox control system. The vehicle's LACC system assistance may also be largely controlled by one or more of the vehicle's control systems so that the vehicle runs as economically as possible, e.g. by somewhat reducing its speed at the end of an upgrade followed by a downgrade on which the vehicle will be subject to a positive force component provided by gravity in the direction of travel and will therefore accelerate again to desired speed.

SUMMARY OF THE INVENTION

An object of the present invention is to propose a method for running a vehicle which can further reduce the fuel consumption of vehicles powered by a combustion engine, particularly on downhill runs.

The present invention relates to a method for running a vehicle provided with an engine, e.g. a combustion engine, which can selectively be connected to at least one driveshaft to deliver driving force to said driveshaft for propulsion of said vehicle. When said vehicle is in motion, the method comprises determining whether the vehicle is approaching a downgrade, and, when the vehicle is approaching said downgrade, disconnecting said engine from said at least one driveshaft before the vehicle reaches said downgrade.

This affords the advantage that according to the present invention a speed decrease can be achieved before a downgrade at least partly by opening the power train (so-called freewheeling). This makes it possible for the vehicle's speed to be reduced in a fuel-economising way before a downgrade and for the subsequent downgrade to be utilised to accelerate the vehicle again to desired speed. Opening the power train instead of merely shutting off fuel supply to the engine results in a fuel saving in that the speed decrease and consequent reduction in fuel consumption can be initiated at an earlier stage than has previously been possible.

Further characteristics of the present invention and advantages thereof are indicated by the detailed description of embodiment examples set out below and the attached drawings.

BRIEF DESCRIPTION OF DRAWINGS

FIG. 4 illustrates an example of a method according to the present invention.

DETAILED DESCRIPTION OF EMBODIMENTS

Figure 1A:
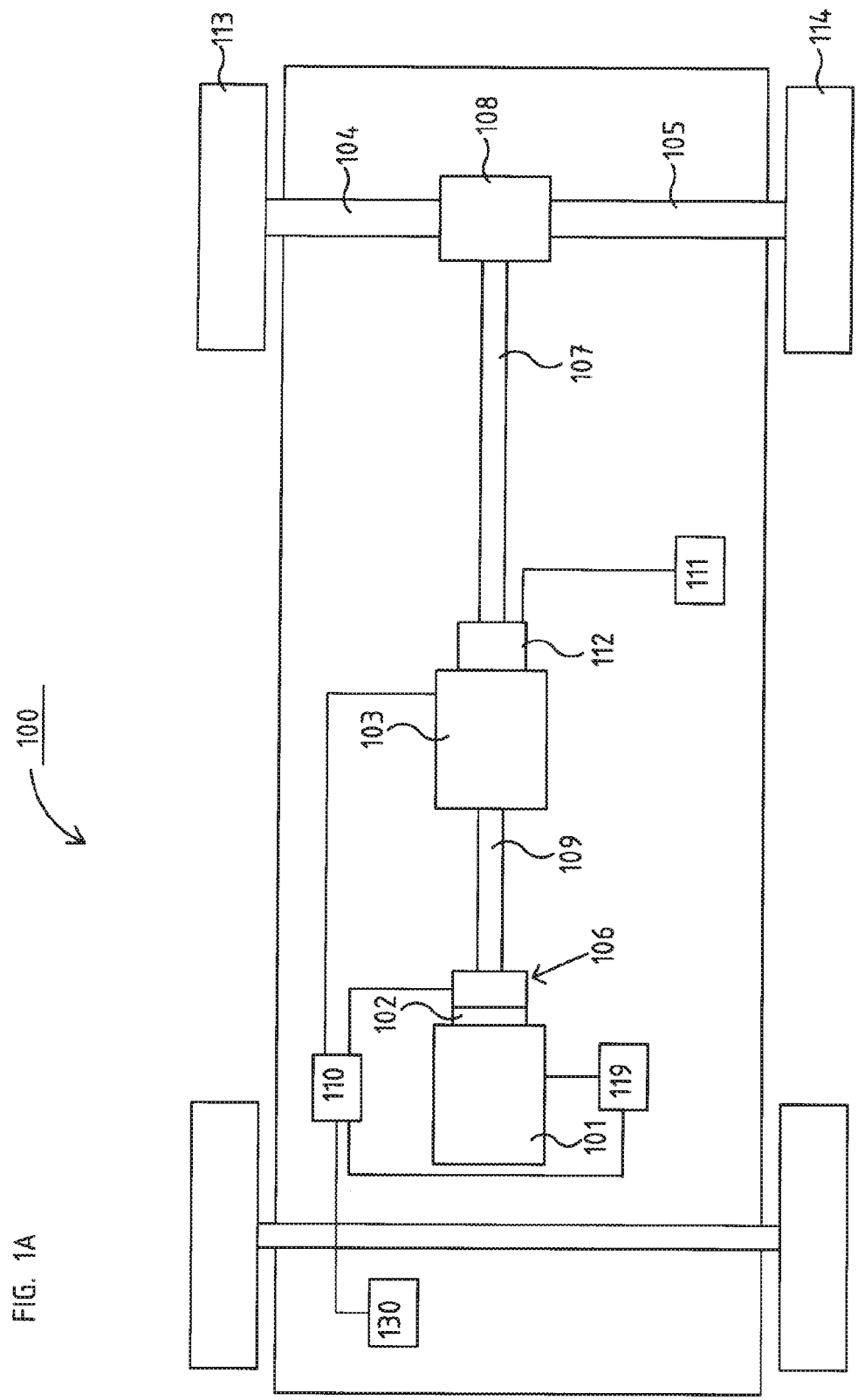
FIG. 1A depicts a power train in a vehicle in which the present invention may be used.

FIG. 1A depicts schematically a power train in a vehicle 100 according to an embodiment of the present invention. The power train comprises a combustion engine 101 which in a conventional way is connected, via an output shaft of the engine, usually via a flywheel 102, to an input shaft 109 of a gearbox 103 via a clutch 106. The clutch may for example take the form of an automatically controlled clutch and be controlled by the vehicle's control system via a control unit 110. The control unit 110 also controls the gearbox 103. The vehicle 100 further comprises driveshafts 104, 105 which are connected to the vehicle's tractive wheels 113, 114 and are driven by an output shaft 107 from the gearbox 103 via an axle gear 108, e.g. a conventional differential.

The vehicle 100 further comprises various different brake systems, e.g. a conventional service brake system, which may for example comprise brake discs with associated brake linings (not depicted) situated adjacent to each wheel. The service brake system is controlled by the vehicle's control system by means of a brake control unit 111 which in a conventional way sends signals to, for example, the regulator or regulators which regulate the braking force in the service brake system.

The brake control unit 111 may also be adapted to controlling other brake systems on board the vehicle as well as the service brake system. Heavy vehicles are often provided with further brake systems, e.g. in the form of conventional retarders 112 and/or other supplementary brake systems such as various kinds of exhaust brake systems, compression brake systems, electromagnetic brake systems and engine brakes. On the basis of commands initiated by the vehicle's driver and/or other control units, the control unit 111 (or some other suitable control unit) sends control signals to suitable system modules to demand desired braking force from desired brake systems. Supplementary brake systems may also be controlled directly by the driver, e.g. via buttons or pedals, in which case the pedal or lever may be directly connected to another control unit which sends information to, for example, a retarder control unit.

Control systems in modern vehicles generally comprise a communication bus system consisting of one or more communication buses for connecting together a number of electronic control units (ECUs), or controllers, and various components onboard the vehicle. Such a control system may comprise a large number of control units and the responsibility for a specific function may be divided between two or more of them. Vehicles of the type here concerned are therefore often provided with significantly more control units than depicted in FIG. 1A, as one skilled in the art will surely appreciate.

In the embodiment depicted, the present invention is implemented in the control unit 130 but might also be implemented wholly or partly in one or more other control units already on board the vehicle or a control unit dedicated to the present invention. The vehicle depicted in FIG. 1A is also provided with a control unit 130 in which a look-ahead function for using, for example, a so-called "look ahead" cruise control (LACC) as described above is implemented.

The control exercised by the control unit 110 over the gearbox 103 will thus depend not only upon, for example, an engine control unit 119 but also upon information received from the control unit 130.

Control units of the type here concerned are normally adapted to receiving sensor signals from various parts of the vehicle, e.g. the control unit 110 may receive sensor signals from the gearbox 103 and signals from, for example, the brake control unit 111 and the engine control unit 119 as well as the control unit 130. Control units of the type here concerned are also usually adapted to delivering control signals to various vehicle parts and components. In the present example, the control unit 130 delivers signals to the control unit 110 which itself delivers signals to various control devices to demand desired gear ratios in the gearbox 103 and opening/closing of the clutch 106.

Control is often governed by programmed instructions, typically in the form of a computer program which, when executed in a computer or a control unit, causes the computer/control unit to effect desired forms of control action, e.g. method steps according to the present invention. The computer program usually takes the form of a computer program product 129 which is stored on a digital storage medium 121 (see FIG. 1B), e.g. ROM (read-only memory), PROM (programmable read-only memory), EPROM (erasable PROM), flash memory, EEPROM (electrically erasable PROM), a hard disc unit etc., in or connected to the control unit, and which is executed by the control unit. The vehicle's behaviour in a specific situation is therefore modifiable by altering the computer program's instructions.

Figure 1B:
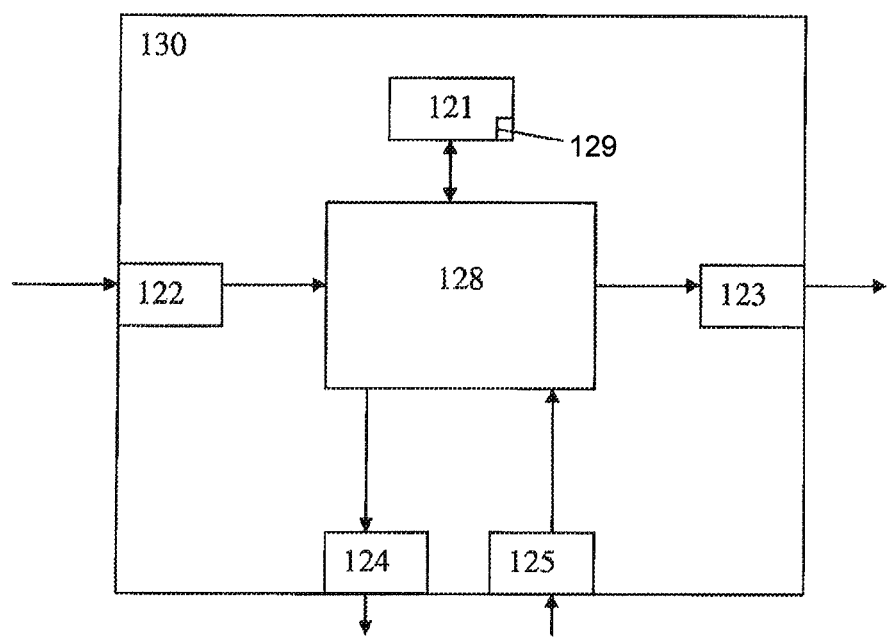
FIG. 1B depicts a control unit in a vehicle control system.

An example of a control unit (the control unit 130) is depicted schematically in FIG. 1B, possibly comprising a calculation unit 128 which may for example take the form of some suitable type of processor or microcomputer, e.g. a circuit for digital signal processing (Digital Signal Processor, DSP), or a circuit with a predetermined specific function (Application Specific Integrated Circuit, ASIC). The calculation unit 128 is connected to a memory unit 121 which provides it with, for example, the stored program code 129 and/or the stored data which the calculation unit needs for it to be able to perform calculations. The calculation unit 128 is also arranged to store partial or final results of calculations in the memory unit 121.

The control unit is further provided with respective devices 122, 123, 124, 125 for receiving and sending input and output signals. These input and output signals may comprise waveforms, pulses or other attributes which the input signal receiving devices 122, 125 can detect as information and which can be converted to signals which the calculation unit 128 can process. These signals are therefore conveyed to the calculation unit 128. The output signal sending devices 123, 124 are arranged to convert signals received from the calculation unit 128 in order, e.g. by modulating them, to create output signals which can be conveyed to other parts of the vehicle's control system and/or the component/components for which the signals are intended. Each of the connections to the respective devices for receiving and sending input and output signals may take the form of one or more from among a cable, a data bus, e.g. a CAN (Controller Area Network) bus, an MOST (Media Orientated Systems Transport) bus or some other bus configuration, or a wireless connection.

As mentioned above, the fuel economics of a vehicle may be improved by using an LACC (look-ahead cruise control) function to reduce the vehicle's speed at the end of an upgrade or along a level section of road which precedes a downgrade, in order thereafter to benefit from the reduced driving power requirement on a subsequent downgrade where that requirement is often negative, i.e. such that the vehicle can be accelerated by positive contributions from the force of gravity without fuel having to be supplied to the engine.

According to the present invention, however, the fuel consumption may be further reduced by the way in which speed decreases before a downgrade is reached, as will be described with reference to FIGS. 3A-B, and a method 400 which is depicted in FIG. 4. Method 400 begins with a step 401 which determines whether the vehicle is approaching a downgrade. This determination may be conducted continuously until it is determined that the vehicle will reach a downgrade within, for example, a certain time, e.g. a certain number of seconds, or within a certain distance, e.g. a certain number of meters, e.g. 100 m, 200 m, 300 m etc.

This determination is done by means of a look-ahead function which is therefore implemented in the control unit 130 in FIG. 1A, but might also be implemented in any other onboard control unit. As above, an LACC uses knowledge of the itinerary ahead of the vehicle to modify the vehicle's speed according to prevailing circumstances. Knowledge of the road section ahead may for example comprise prevailing topography, road curvature, traffic situation, condition of road and speed limitations for the section ahead, and also traffic signs adjacent to the road.

On the basis of this information and vehicle location information which may for example be obtained in the form of information from suitable positioning and/or navigation systems, such as a telemast system and/or a satellite positioning system, e.g. GPS (global positioning system) information, the LACC function can determine how much time and/or distance remains before a coming downgrade. Weather reports/ data from weather meters may also be used in calculations described below according to the present invention when for example strong tail/headwinds might affect the driving force required for the vehicle's propulsion.

Figure 3A:
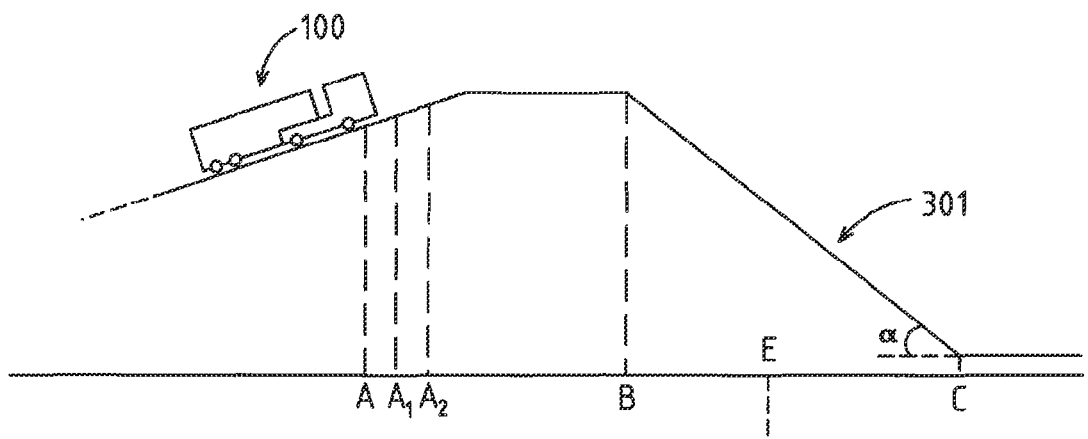
FIG. 3A depicts a vehicle approaching a downgrade with a gradient angle such that the vehicle will accelerate both when freewheeling and when dragging.

FIG. 3A depicts a downgrade 301 with the gradient angle α which as below is such that the exemplified vehicle 100 would at least accelerate when freewheeling. When thereafter step 401 determines that the vehicle is approaching a downgrade, which may for example be at location A in FIG. 3A, i.e. as early as when the vehicle is still on an upgrade, the method moves on to step 402.

According to the present invention, speed decrease before a downgrade is effected at least partly by means of freewheeling.

Historically the speed decrease has been effected by reducing the demand for positive engine torque (i.e. the engine delivering propulsive force in the direction of travel via tractive wheels) or by dragging. Dragging means running the vehicle with the power train closed, i.e. with the engine connected to the tractive wheels, but with no fuel supply to the engine. An advantage of this type of measure is that since the fuel supply is shut off the engine's fuel consumption will also be nil. It does however mean that the engine will be driven by the tractive wheels via the power train, a situation known as "dragging" in which the engine's internal losses give rise to a braking force, i.e. the vehicle is engine-braked.

The present invention employs instead freewheeling, which means the vehicle's engine 101 is disconnected from the tractive wheels 113, 114, i.e. the power train being opened. This disconnection by opening the power train may for example be achieved by putting the gearbox 103 into neutral or by opening the clutch 106. Disconnecting the engine from the tractive wheels when the vehicle is in motion is referred to below as freewheeling. Freewheeling will result in reduced fuel consumption, and the reason for this is described in detail in the parallel Swedish patent application 1150527-8 entitled "Method and system pertaining to vehicles I", with the same filing date, inventor and applicant as the present application.

Step 402 therefore determines whether the power train should be opened, and the vehicle thus be caused to freewheel, at location A in order to achieve a desired speed decrease before the downgrade begins, or whether the power train should remain closed with demand for positive driving torque for a further period of time.

This determination may be done by means of the LACC function and suitable data from the vehicle's control system, e.g. current engine load data from the engine control unit 119. On the basis of prevailing engine load and LACC data as above, the vehicle's weight can be estimated and it is also possible to estimate how its speed will change when the power train is opened.

If the power train is not to be opened, the method moves on to step 403 and stays there until a timer $t_1$ reaches a time $T_1$ which may for example be one second or a shorter or longer period of time. The period may for example also be controlled by the vehicle's prevailing speed. When the timer $t_1$ reaches time $T_1$, the method goes back to step 402 for another determination of whether the power train should be opened.

According to this embodiment, the vehicle will thus travel a distance corresponding to the time $T_1$ between determinations at step 402, such that successive determinations are for location $A_1$, $A_2$ etc. in FIG. 3A.

The determination at step 402 may be done in a number of different ways and on the basis of different criteria. It is for example possible for step 402 to determine how far and/or to what level the vehicle's speed will drop at the beginning of the downgrade if the engine is disconnected from the tractive wheels at locations A (or whatever location the vehicle has reached on the one or more occasions when the time $t_1$ reaches time $T_1$ as above, i.e. $A_1$, $A_2$ etc).

Depending on the remaining distance to the beginning of the downgrade, i.e. to location B in FIG. 3A, and depending on where on the upgrade the vehicle is at the time, its speed will decrease to a greater or lesser extent when the engine is disconnected and positive driving force is therefore no longer conveyed to its tractive wheels.

Figure 3B:
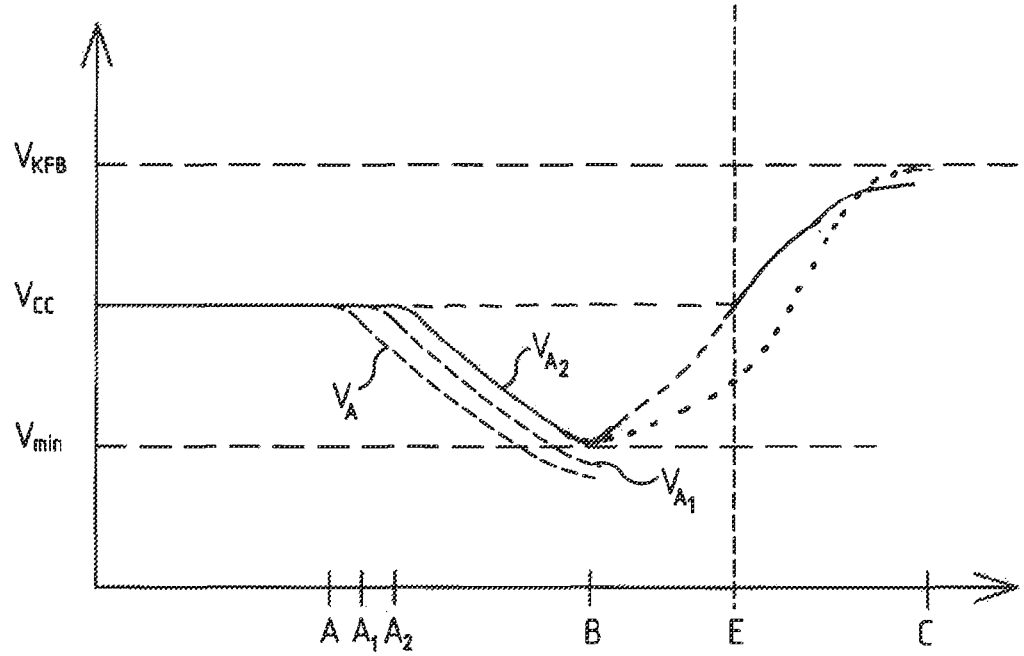
FIG. 3B depicts schematically the vehicle's respective speeds when freewheeling and dragging on the downgrade depicted in FIG. 3A.

The vehicle's speed is illustrated in FIG. 3B. The speed $v_{cc}$ may for example be a speed set by the vehicle's driver, which is also the speed which the vehicle would maintain if it was equipped with a traditional cruise control which would endeavour to ensure that the set speed was maintained both uphill and downhill. It is also the speed which the vehicle maintains (at least) up to location A. If the engine is disconnected at location A, the vehicle's speed will begin to drop and the speed decrease will proceed until at least the location B where the downgrade begins. Step 402 may for example determine whether the vehicle's speed is estimated to drop to below a speed $v_{min}$, and the power train is not opened so long as the result of the estimate is that the vehicle's speed will go below $v_{min}$.

The speed $v_{min}$ may for example be a lowest speed considered appropriate to avoiding too much discomfort for the vehicle's driver. If the speed $v_{min}$ is set at too low a value, the driver may also experience stress from fellow road users whose vehicles do not have the benefit of such systems for helping to reduce fuel consumption. If the vehicle's speed is allowed to decrease too much, this may be viewed negatively by the driver. The speed $v_{min}$ may also be set with respect to time. If the vehicle's speed is allowed to deviate too much from $v_{cc}$, its total journey time may be adversely affected, with consequently higher costs in terms of driver pay etc. The speed $v_{min}$ may therefore be chosen according to a cost function, e.g. strategies according to the method referred to in Swedish patent application 1050809-1 may be employed. The speed $v_{min}$ may also be determined at least partly on the basis of the speed increase which the vehicle is expected to undergo downhill.

Instead of determining whether the power train should be opened on the basis of the speed which will be reached, the decision at each step may instead be based on of a cost function. As well as referring to SE1000716 as above, it is possible to use a cost function of the type $$cst_{A_i} = c_1 \frac{fuel_{A_i}}{fuel_{v_{cc}}} + c_2 \frac{time_{A_i}}{time_{v_{cc}}}$$

to determine power train opening locations. $cst_{A_i}$ denotes the cost of opening the power train at a location $A_i$, which cost can be compared for different locations $A_i$, making it possible for the power train to be opened at whichever location $A_i$ results in lowest cost. $fuel_{A_i}$ is the cumulative fuel consumption if the power train is opened at location $A_i$, and $fuel_{v_{cc}}$ the cumulative fuel consumption if the vehicle continues running at the speed $v_{cc}$. Similarly, $time_{A_i}$ is the time it takes to drive the vehicle if the power train is opened at location $A_i$, whereas $time_{v_{cc}}$ is the time it takes to drive the vehicle at the speed $v_{cc}$. $c_1, c_2$ are respective weighting constants which regulate the significance of less fuel saving against longer journey time. The aggregate of the constants $c_1, c_2$ may for example equal 1. Thus determining the cost of opening the power train at different locations makes it possible for it to be opened at whichever location results in lowest total cost according to the above equation.

Taking decisions according to the cost function may also be subject to certain secondary conditions, e.g. decisions which would result in the vehicle's speed going below $v_{min}$ may be rejected.

It is also conceivable to compare the cost function for freewheeling with a corresponding cost function for dragging, whereby lowest cost, subject to applicable secondary conditions, results in optimum control.

In the present example, on the basis of the speed determination as described above, the vehicle's speed if the power train is opened at location A will drop below $v_{min}$, as illustrated by the broken line $v_A$ from location A to location B in FIG. 3B. As described above, the method therefore, after a determination at location A, moves on to step 403 and stays there for time $T_1$ before another determination is made. During this period the vehicle will as described above, have traveled to location $A_1$. At location $A_1$ it is still found that the vehicle's speed will drop to too low a level as per the broken line $v_{A1}$, so the method again waits for a period $T_1$ at step 403 for another determination when the vehicle has traveled a little further. This is repeated until it is found at step 402 that the vehicle's speed will not go below $v_{min}$, which in the present example occurs at location $A_2$. In this situation step 402 thus determines that the power train should be opened, so the method moves on to step 404 at which the power train is opened immediately, since the vehicle will already be at location $A_2$, e.g. by opening the clutch 103 or by putting the gearbox into neutral.

When the power train has been opened, the vehicle's speed will, as described above, begin to decrease and will at location B reach $v_{min}$ (or at least a speed close to $v_{min}$, depending on when the power train opening actually takes place, e.g. owing to delays in the system etc.) so that the beginning of the downgrade causes the vehicle to be accelerated again by a positive contribution from the force of gravity as described above.

Thus the determination of times for opening of the vehicle's power train is described above according to a method whereby the vehicle travels between determinations. According to an alternative embodiment, however, determinations of the time/location for power train opening have already occurred when the vehicle reaches location A. This case involves using a method similar to that illustrated by steps 402-403 in FIG. 4 except that at step 403 for a location $A_i$ (where at the first determination $A_i = A$) a timer is instead immediately incremented by time corresponding to a distance $s_1$ which may for example be 1 meter, 5 meters, 10 meters, 20 meters or some other suitable distance. The distance may for example also be determined by how far the vehicle travels at current speed in a certain time, e.g. a time determined according to the timer $t_1$ above.

This is followed at step 402 by determination of the speed which the vehicle will have at location B if the power train is opened at location $A_i$, which means in this embodiment that in practice the estimation is already done before the vehicle reaches location $A_i$. This is achieved by using current data about, for example, vehicle speed, engine torque applied and LACC data to estimate how the vehicle will behave if the power train is opened at location $A_i$. If it is determined that the vehicle's speed will be too low if the power train is opened at location $A_i$, the method goes back to step 403 for another distance increment ($A_i = A_i + s_i$), and another determination takes place at step 402. This is repeated until a location $A_i$ at which the speed condition is fulfilled has been determined.

The great difference with this embodiment is thus that the vehicle's speed at location B is already estimated for a plurality of locations $A_i$ substantially at location A rather than not until a location $A_i$ is reached (the vehicle may of course have left location A before the determination is completed, depending on how long a time the estimation takes). When the location for opening the power train has been determined at step 402 according to this embodiment, the vehicle is in practice expected to reach the location $A_i$ determined and the power train can be opened at step 404.

When the engine has thus been disconnected from the tractive wheels at step 404 and the vehicle is therefore freewheeling, the method moves on to step 405 which determines how the vehicle should be run when it reaches location B, i.e. when the downgrade begins.

Various measures may be adopted for reducing downhill fuel consumption. One such measure is running the vehicle while dragging. As mentioned above, however, this results in a braking action, i.e. the vehicle is engine-braked.

The engine's internal losses are usually related to its own speed in such a way that they increase with increased engine speed, and hence too the engine braking force, so dragging is usually conducted with as high a gear as possible engaged in the gearbox (i.e. in as low a gear ratio as possible) to reduce the engine's speed, and hence also its losses, during dragging.

For this reason it may be advantageous instead to let the vehicle freewheel downhill.

In the case of freewheeling, however, the tractive wheels are not subject to any engine braking effect, which means that the vehicle will roll more easily downhill and thereby also reach a higher speed at the end of the downgrade as compared with dragging (the vehicle can accelerate to a higher speed or be retarded less than when dragging). Speed increase by freewheeling is however achieved at the cost of the fuel consumption required to keep the engine running at idling speed.

Figure 2:
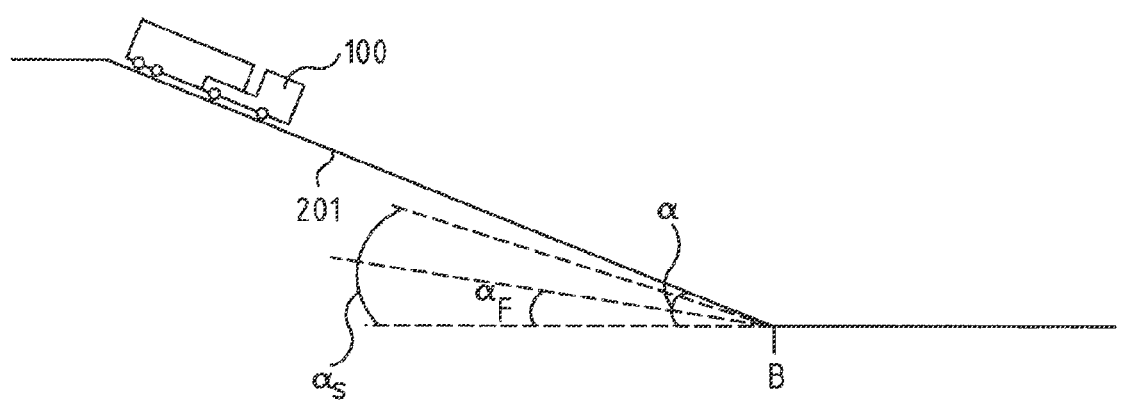
FIG. 2 depicts an example of a downgrade on which the present invention is applicable.

Depending on the magnitude of the gradient angle $\alpha$, the vehicle will behave in different ways when respectively dragging and freewheeling. FIG. 2 depicts an example of a downgrade with a gradient angle $\alpha$. Depending on the magnitude of the angle $\alpha$, the vehicle will be subject to a greater or smaller positive force in the direction of travel, i.e. the positive contribution from the force of gravity will help to propel the vehicle so the need for driving force from the engine decreases or totally ceases. If the angle $\alpha$ in FIG. 2 is smaller than an angle $\alpha_F$, the vehicle will retard both when dragging and when freewheeling (although in freewheeling it will not be retarded as much as when dragging). If $\alpha = \alpha_F$, the vehicle will still be retarded when dragging, but its acceleration during freewheeling will be nil, i.e. during freewheeling the vehicle, given a constant gradient with this angle ($\alpha_F$), will maintain the speed it had at the beginning of the downgrade. If the angle subsequently increases to $\alpha > \alpha_F$, the vehicle, with the engine disconnected, will accelerate downhill and therefore reach at the end of the downgrade a speed which exceeds that which it had at the beginning of the downgrade. An increasing angle $\alpha$ will result in greater acceleration when the power train is disconnected, while the retardation during dragging also becomes less and less. If the angle $\alpha$ amounts to $\alpha_S$, which is a larger angle than $\alpha_F$, the vehicle's acceleration during dragging will be nil, i.e. the vehicle will maintain its speed even when dragging. Finally, if the angle $\alpha$ is larger than $\alpha_S$, the vehicle will accelerate both when dragging and when freewheeling.

Previously, the only situations in which the engine was disconnected from the tractive wheels and the vehicle therefore freewheeled were those fulfilling the condition $\alpha < \alpha_S$, i.e. only on downgrades where acceleration might have been possible when freewheeling but not with the engine dragging. Dragging was employed if the angle $\alpha$ exceeded $\alpha_S$. This is understandable in that dragging also gives rise to acceleration at angles $\alpha > \alpha_S$ while at the same time the fuel consumption, unlike the case of freewheeling, is nil.

In contrast, said parallel Swedish patent application 1150527-8 entitled "Method and system pertaining to vehicles I", with the same filing date, inventor and applicant as the present application, describes a method and system whereby the vehicle is allowed to freewheel even in situations where $\alpha > \alpha_S$, i.e. where the vehicle would have accelerated when dragging. That method may also be employed here.

Step 405 determines whether the power train should again be closed when the vehicle reaches location B. Similar to above, this determination may be arranged to only take place when the vehicle reaches location B, and step 405 may be preceded by a waiting step in which the method stays until the vehicle reaches position B. According to an embodiment, however, the determination commences already before the vehicle reaches location B, as described above in relation to opening the power train. The determination at step 405 may also be conducted by means of the LACC function and data from the vehicle's control system as described above.

Vehicles of the type here concerned often have an upper speed limit $v_{KFB}$ which is higher than $v_{cc}$ and is not to be exceeded, e.g. because of government regulations or because the vehicle's manufacturer states a maximum speed. The speed $v_{KFB}$ may also be set by the vehicle's driver. If this speed is reached, the vehicle will usually automatically begin using supplementary brake systems to ensure that it is not exceeded.

For this reason, step 405 therefore determines whether after the vehicle has reached location B it will risk being accelerated by the subsequent downgrade to a speed exceeding said set speed $v_{KFB}$.

If such is not the case, i.e. if it is determined that the vehicle can travel the whole downgrade, i.e. up to location C, the end of the downgrade in FIG. 3A, without reaching the speed $v_{KFB}$, it is run with the engine disconnected from the power train throughout the downgrade, allowing it to accelerate all the way. Prior art has not employed freewheeling on downgrades which are such that the vehicle would have accelerated even when dragging. In contrast, the present invention employs freewheeling even in such situations, at least so long as the speed $v_{KFB}$ will not be reached. This means that at location C the vehicle will be travelling faster than the speed $v_{cc}$, so it can continue to freewheel beyond location C until its speed drops to $v_{cc}$. This is represented in FIG. 4 by step 406, which the method stays at until the vehicle's speed drops to $v_{cc}$, whereupon the power train is closed at step 407 for normal propulsion of the vehicle. The method then goes back to step 401 pending another downgrade.

If, on the contrary, step 405 determines that the speed $v_{KFB}$ will be reached on the downgrade, causing one or more of the vehicle's brake systems to be activated to prevent speed increase beyond $v_{KFB}$, the method moves on to step 408.

A scenario in which the vehicle is initially accelerated by freewheeling, only thereafter to be braked, is not desirable in that the freewheeling involves fuel consumption to keep the engine running at idling speed, which might otherwise be at least partly avoided. Step 408 therefore determines whether the speed $v_{KFB}$ will be reached even when the vehicle runs with the power train closed and no fuel supply, i.e. when dragging. If the speed $v_{KFB}$ will be reached even when dragging, the method moves on to step 409 at which the power train is closed when the vehicle reaches location B, since dragging results in less fuel consumption than freewheeling to the location where the speed $v_{KFB}$ is reached. Such a situation is represented in FIG. 3B by a dotted line from location B.

The method then moves on to step 410 which determines whether the vehicle has reached location C. The method stays at step 410 until the vehicle reaches location C and has therefore passed the downgrade. The method then moves on to step 411 at which the engine is again disconnected from the tractive wheels to resume freewheeling.

As its speed in this case is higher than $v_{cc}$, the vehicle can freewheel until its speed again drops to $v_{cc}$. The method therefore proceeds from step 411 to step 406 as described above.

If step 408 determines that the speed $v_{KFB}$ will not be reached if the vehicle runs with the power train closed throughout the downgrade, but will be reached when freewheeling as at step 405, the method moves on to step 412, which determines whether the speed $v_{KFB}$ will be reached if dragging commences at a time $T_2$ (or a distance $S_2$) after the vehicle has passed location B. The time $T_2$/distance $S_2$ may be any suitable time/distance as above and may for example be a constant or depend on the prevailing gradient angle of the downgrade. This means that the vehicle is allowed to freewheel for a certain time or distance during which it is determined whether it will reach the speed $v_{KFB}$ if it switches to dragging at that time. If such is not the case, a timer $t_2$/distance $s_2$ is incremented by a further interval $T_2/S_2$ at step 413, and another determination is done at step 412.

This determination may thus also be conducted by any of the methods described above in relation to steps 402-403, i.e. it may be conducted for the location where the vehicle is at the time, in which case the iteration continues until it is determined that the speed vKFB will be reached, in which case the power train is closed at step 414 when it is found that vKFB will be reached by dragging. Alternatively, the determination may take place already before the vehicle reaches location B, with determination of a location for closing the power train (after its opening at location B), and when the vehicle reaches this specific location the power train can be closed at step 414.

When the power train has been closed at step 414, the vehicle will thus drag in order to use engine braking to avoid reaching the speed $v_{KFB}$. The method then moves on to step 415 to determine whether the power train should be reopened. It may for example be found, when the vehicle has accelerated to a speed close to $v_{KFB}$, that its speed begins to decrease, e.g. because it has reached the end of the downgrade or the gradient angle has decreased. Thus it may be that dragging need only take place for a shorter period before the power train can be reopened to allow acceleration by freewheeling without reaching the speed $v_{KFB}$. As above, in this situation it is advantageous to open the power train in order to freewheel until the vehicle's speed drops to $v_{cc}$. When it is thus determined at step 415 that the power train should be opened, this is effected at step 416 and the method then proceeds to step 406 as above.

The method has also been described above such that the vehicle initially freewheels and thereafter drags if it would reach the speed $v_{KFB}$ when freewheeling but not when dragging. The method may however also be the opposite such that the power train is closed at location B before being opened at a location E between B and C for which it is determined that the speed $v_{KFB}$ will not be reached when the power train is opened.

The method may also involve the power train being opened and closed more than once during a downgrade, depending on its length and/or variations in its gradient angle.

The above description describes freewheeling according to a method whereby the engine during freewheeling runs at idling speed, resulting in fuel consumption. According to an embodiment, the engine is switched off when freewheeling, resulting in further reduced fuel consumption as compared with situations where the engine is merely disconnected from the driveshafts and situations where the vehicle drags. The engine may be switched off for the whole or one or more parts of the period of time when the vehicle is freewheeling.

According to an embodiment, the engine is only switched off in situations where it is determined that this is advantageous. It is for example possible to determine whether the engine may be switched off for a first period of time before having to be restarted. This determination may for example be done by means of a look-ahead function as above. The period of time may for example be based on the fuel saving achieved by switching said engine off, and may for example be a period which at least results in reduced fuel consumption corresponding to that arising from restarting said engine with a starter motor. The parallel Swedish patent application entitled "Method and system pertaining to vehicles III", with the same filing date, inventor and applicant as the present application, describes a method and system whereby the vehicle's engine is switched off during freewheeling when switching off is possible for at least a first period of time. That method may also be applied here.

The present invention is not restricted to the invention's embodiments described above but relates to and comprises all embodiments within the protective scope of the attached independent claims. In the example referred to above, freewheeling is employed for the whole speed decrease up to the beginning of the downgrade. According to an embodiment, however, freewheeling may be employed to a beginning, in which case the speed decrease may end with dragging. The advantage of this is that the speed decrease can be ended quickly, e.g. if it is found that the decrease will take more than a certain time in a situation where a long speed decrease period might cause discomfort to the vehicle's driver.

The invention claimed is:

1. A method for running a vehicle, wherein the vehicle comprises a combustion engine and a driveshaft to which the engine is configured to be selectively connected by at least one control unit to deliver driving force to the driveshaft for propulsion of the vehicle, the method comprising:
   during running of the vehicle:
   the at least one control unit determining whether the vehicle is approaching a beginning of a downgrade;
   when the vehicle is determined to be approaching the beginning of the downgrade by the at least one control unit, the at least one control unit disconnects the engine from the driveshaft before the vehicle reaches the beginning of the downgrade;
   the at least one control unit predicts whether the vehicle speed will reach, on the downgrade when the vehicle is running with the engine disconnected from the driveshaft, a maximum permissible speed set for the vehicle, the prediction of the at least one control unit occurring before the vehicle speed reaches the maximum permissible speed; and
   if it is determined by the at least one control unit that the vehicle will reach, on the downgrade, the maximum permissible speed set for the vehicle, the at least one control unit runs the vehicle on at least part of the downgrade with the engine connected to the driveshaft and with no fuel supply to the engine.

2. The method according to claim 1, wherein the at least one control unit is situated in a control system of the vehicle.

3. The method according to claim 1, further comprising:
   the at least one control unit determining a first location ($A_i$) along travel of the vehicle at which the engine should be disconnected from the driveshaft.

4. The method according to claim 3, further comprising:
   the at least one control unit determining the first location ($A_i$) based on at least one of: (1) the at least one control unit determining the speed at which the vehicle will be travelling when the vehicle reaches the downgrade and (2) the at least one control unit determining a speed decrease which the vehicle will undergo from the first location ($A_i$) until the vehicle reaches the downgrade.

5. The method according to claim 3, further comprising:
   the at least one control unit determining the first location ($A_i$) based on at least one of: (1) a maximum permissible speed decrease for the vehicle and (2) a lowest permissible speed for the vehicle before the vehicle reaches the downgrade.

6. The method according to claim 3, further comprising:
   the at least one control unit determining at least one of: (1) the vehicle's expected speed at, and (2) the vehicle's expected speed decrease to, the beginning of the downgrade for a plurality of the locations ($A_i$); and
   the at least one control unit disconnecting the engine from the driveshaft at a selected one of the locations ($A_i$) for which it is determined that the vehicle will substantially undergo at least one of: (1) a maximum permissible speed decrease and (2) reach a lowest permissible speed before the vehicle reaches the downgrade.

7. The method according to claim 5, further comprising the at least one control unit determining at least one of: (1) the maximum permissible speed decrease and (2) the lowest permissible speed at least partly based on a loss of time caused by a speed decrease upon the disconnection of the engine from the driveshaft.

8. The method according to claim 5, wherein at least one of: (1) the maximum permissible speed decrease and (2) the lowest permissible speed are determined by the at least one control unit at least partly based on a speed increase which the vehicle is expected to undergo on the downgrade.

9. The method according to claim 1, further comprising:
   the at least one control unit determining whether the vehicle will travel a downgrade and determining when the engine should be disconnected from the driveshaft based on at least one of: (1) data concerning the itinerary ahead of the vehicle, and (2) data concerning at least one of: (1) the topography of the itinerary ahead of the vehicle and (2) the vehicle's location.

10. The method according to claim 1, further comprising, when the vehicle reaches the downgrade, the at least one control unit running the vehicle on the downgrade with the engine disconnected from the driveshaft.

11. The method according to claim 1, further comprising, when the vehicle reaches an end of the downgrade, the at least one control unit running the vehicle with the engine disconnected from the driveshaft for at least as long as the vehicle is travelling above a set speed ($v_{cc}$).

12. The method according to claim 1, further comprising:
the at least one control unit determining a first location ($A_t$) at which the engine should be disconnected from the driveshaft, the first location ($A_t$) being determined at least partly based on a cost function with weighting of fuel saving during freewheeling of the vehicle and time loss during the freewheeling.

13. The method according to claim 1, further comprising the at least one control unit switching the engine off for at least part of the time when the engine is disconnected from the driveshaft.

14. A computer program product comprising a non-transitory computer-readable medium and a computer program contained in the computer-readable medium, wherein the program comprises program code and which, when the program code is executed in a computer, causes the computer to apply the method according to claim 1.

15. The method according to claim 1, wherein the at least one control unit determines, at a time before the vehicle reaches the beginning of the downgrade, whether the vehicle speed will reach, on the downgrade when the vehicle is running with the engine disconnected from the driveshaft, the maximum permissible speed set for the vehicle.

16. The method according to claim 1, wherein the at least one control unit determines, at a time when the vehicle reaches the beginning of the downgrade, whether the vehicle speed will reach, on the downgrade when the vehicle is running with the engine disconnected from the driveshaft, the maximum permissible speed set for the vehicle.

17. The method according to claim 1, wherein the at least one control unit determines, at a time after the vehicle reaches the beginning of the downgrade, whether the vehicle speed will reach, on the downgrade when the vehicle is running with the engine disconnected from the driveshaft, the maximum permissible speed set for the vehicle.

* * * * *